(12) United States Patent
Miyazono

(10) Patent No.: US 8,786,854 B2
(45) Date of Patent: Jul. 22, 2014

(54) SPECTROSCOPIC DETECTOR

(75) Inventor: Yuya Miyazono, Tokyo (JP)

(73) Assignee: Olympus Corporation, Tokyo (JP)

(*) Notice: Subject to any disclaimer, the term of this patent is extended or adjusted under 35 U.S.C. 154(b) by 106 days.

(21) Appl. No.: 13/316,767

(22) Filed: Dec. 12, 2011

(65) Prior Publication Data

US 2012/0154803 A1 Jun. 21, 2012

(30) Foreign Application Priority Data

Dec. 17, 2010 (JP) ................. 2010-281508

(51) Int. Cl.
*G01J 3/28* (2006.01)
*G01J 3/00* (2006.01)
*G01J 3/02* (2006.01)

(52) U.S. Cl.
CPC ............ *G01J 3/00* (2013.01); *G01J 3/0208* (2013.01); *G01J 3/2803* (2013.01)
USPC ........................................ 356/328; 356/329

(58) Field of Classification Search
USPC .................. 356/305, 400, 328, 330–334; 250/339.07
See application file for complete search history.

(56) References Cited

U.S. PATENT DOCUMENTS

| | | | |
|---|---|---|---|
| 4,756,609 A | | 7/1988 | Estelle |
| 5,969,875 A | * | 10/1999 | Sugawara ............... 359/651 |
| 6,088,059 A | * | 7/2000 | Mihara et al. ........... 348/335 |
| 6,714,280 B2 | * | 3/2004 | Omura ..................... 355/53 |
| 7,315,371 B2 | * | 1/2008 | Kryszczynski et al. .... 356/328 |
| 2002/0054289 A1 | | 5/2002 | Thibault et al. |
| 2004/0207841 A1 | | 10/2004 | Yoshida |
| 2006/0103841 A1 | * | 5/2006 | Ohishi et al. ............. 356/328 |
| 2006/0114459 A1 | | 6/2006 | Aikawa |
| 2006/0164639 A1 | | 7/2006 | Horn et al. |
| 2007/0297718 A1 | | 12/2007 | Oikawa |
| 2010/0079858 A1 | | 4/2010 | Suzuki et al. |

FOREIGN PATENT DOCUMENTS

| | | | | |
|---|---|---|---|---|
| JP | 05-053080 A | 3/1993 | | |
| JP | 09-089668 A | 4/1997 | | |
| JP | 2000-304614 A | 11/2000 | | |
| JP | 2000304614 A | * 11/2000 | ............... | G01J 3/18 |
| JP | 2004-132781 A | 4/2004 | | |
| JP | 2006-153763 A | 6/2006 | | |
| JP | 2008-002914 A | 1/2008 | | |
| JP | 2008-528953 A | 7/2008 | | |
| WO | 2009/011441 A1 | 1/2009 | | |

OTHER PUBLICATIONS

Extended European Search Report (EESR) dated Mar. 22, 2012 (in English) in counterpart European Application No. 11009686.4.
XP-002619942: Gross H. Ed: "Handbook of Optical Systems, Chromatic Aberrations": Jan. 1, 2007; pp. 268-289. (in English).
Japanese Office Action dated May 13, 2014 (and English translation thereof) in counterpart Japanese Application No. 2010-281508.

* cited by examiner

*Primary Examiner* — Gregory J Toatley
*Assistant Examiner* — Maurice Smith
(74) *Attorney, Agent, or Firm* — Holtz, Holtz, Goodman & Chick PC

(57) ABSTRACT

A spectroscopic detector includes a spectroscopic element for dispersing light, a photodetector for detecting the light dispersed by the spectroscopic element and a condensing optical system for condensing the dispersed light to the photodetector and compensating for a deviation in a detected wavelength deriving from nonlinearity of the angle of emergence generated in the spectroscopic element through chromatic aberration of magnification.

3 Claims, 9 Drawing Sheets

<Prior Art>

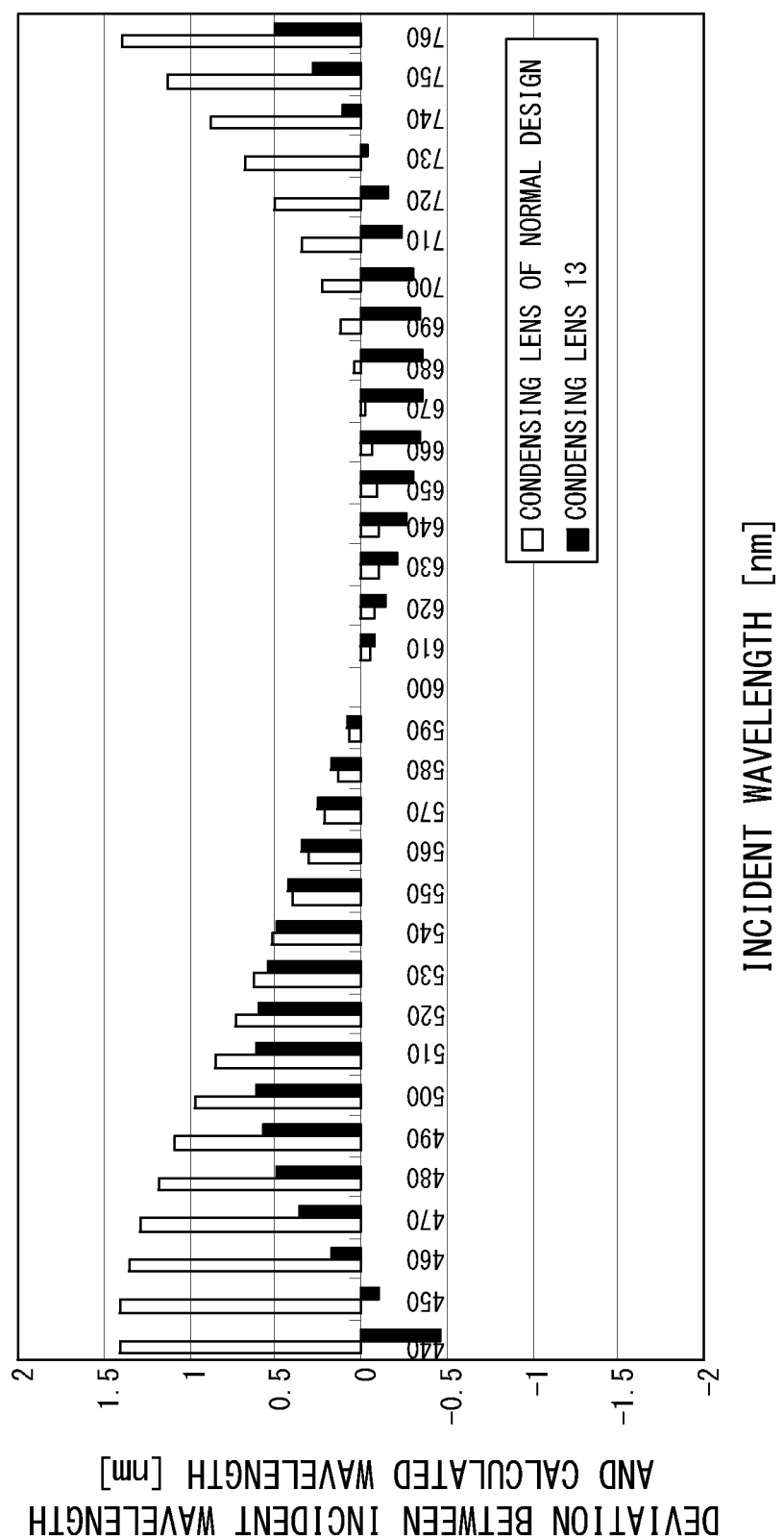
F I G. 5

SPECTROSCOPIC DETECTOR

CROSS REFERENCE TO RELATED APPLICATIONS

This application is based upon and claims the benefit of priority from the prior Japanese Patent Application No. 2010-281508, filed Dec. 17, 2010, the entire contents of which are incorporated herein by this reference.

BACKGROUND OF THE INVENTION

1. Field of the Invention

The present invention relates to a spectroscopic detector, and more particularly, to a spectroscopic detector that simultaneously detects light of a wide wavelength range.

2. Description of the Related Art

A spectroscopic detector is basically made up of a spectroscopic element that disperses light, a condensing optical system that condenses the dispersed light per wavelength and a photodetector that detects the dispersed light. Such a spectroscopic detector identifies the wavelength of the light detected by the photodetector from coordinates at which the dispersed light impinges on the photodetector, to be more precise, coordinates at which the dispersed light impinges on a wavelength calculation surface.

The wavelength calculation surface is generally provided on an image forming surface of the condensing optical system. When a single channel detector is used as the photodetector, the surface on which a slit for limiting light incident on the photodetector is arranged becomes the wavelength calculation surface. On the other hand, when an array detector made up of a plurality of cells is used as the photodetector, light-receiving surfaces of the cells become the wavelength calculation surfaces.

Normally, the size of one step that the slit can move on the wavelength calculation surface or the size of each cell on the wavelength calculation surface is constant. For this reason, coordinates at which light impinges on the wavelength calculation surface preferably linearly changes with respect to the wavelength, and actually many photodetection apparatuses calculate wavelengths assuming that coordinates at which light impinges on the wavelength calculation surface have a linear relationship with the wavelength.

However, no linear relationship actually holds between coordinates at which light impinges on the wavelength calculation surface and the wavelength.

Interference conditions of a diffraction grating, which is a spectroscopic element, is generally expressed by the following Equation (1), where, $\alpha$ is an angle of incidence upon the diffraction grating, $\beta$ is an angle of emergence from the diffraction grating, $\lambda$ is an incident wavelength, N is a grating frequency of the diffraction grating and $\lambda$ is a diffraction order.

$$\sin \alpha + \sin \beta = Nm\lambda \qquad (1)$$

Assuming that the angle of incidence $\alpha$ is constant, when both sides of Equation (1) are differentiated by the angle of emergence $\beta$, the following Equation (2) is derived. Here, $d\beta/d\lambda$ represents a variance of the angle of emergence.

$$d\beta/d\lambda = Nm/\cos \beta \qquad (2)$$

Since the variance of the angle of emergence depends on $\cos \beta$, the angle of emergence nonlinearly changes with respect to the wavelength. That is, the diffraction grating causes the dispersed light to exit at a nonlinear angle of emergence with respect to the wavelength.

In consideration of the fact that a lens whose chromatic aberration is optimally compensated or a condensing mirror free of chromatic aberration is normally used as the condensing optical system, nonlinearity of the angle of emergence with respect to the wavelength is converted to nonlinearity of the condensing position (coordinates) with respect to the wavelength by the condensing optical system.

Furthermore, since the variance of the angle of emergence is inversely proportional to $\cos \beta$, the diffraction grating has a characteristic that the greater the distance of the angle of emergence $\beta$ from 0, the stronger the nonlinearity of angle of emergence $\beta$ with respect to the wavelength $\lambda$. On the other hand, it is not possible to achieve the angle of emergence $\beta=0$ with an arrangement where it is easy to obtain high diffraction efficiency with the diffraction grating, Littrow arrangement with a blazed diffraction grating or arrangement that satisfies a Bragg condition with a VPH (Volume Phase Holographic) grating in particular. For this reason, in a general environment in which a diffraction grating is used, nonlinearity becomes conspicuous and influences thereof are not negligible.

As described so far, with the conventional spectroscopic detector, no linear relationship holds between coordinates at which light impinges on the wavelength calculation surface and the wavelength because of nonlinearity of the angle of emergence with respect to the wavelength of the diffraction grating, which is a spectroscopic element. For this reason, since there is a deviation (hereinafter described as "detected wavelength deviation") between the wavelength calculated on the assumption that coordinates and the wavelength have a linear relationship (hereinafter described as "calculated wavelength") and the wavelength of light actually detected by a photodetector (hereinafter described as "incident wavelength"), it is difficult to accurately detect the wavelength.

FIG. 1 is a schematic diagram illustrating a configuration of a spectroscopic detector according to a prior art. The amount of specific deviation in detected wavelength generated in a spectroscopic detector will be described with reference to FIG. 1 hereinafter.

A spectroscopic detector 100a illustrated in FIG. 1 includes a diffraction grating 1 that disperses incident light IL, a photodetector 2 that detects the dispersed light and a condensing optical system 3a disposed between the diffraction grating 1 and the photodetector 2 to condense the light dispersed by the diffraction grating 1 to the photodetector 2.

The spectroscopic detector 100a is designed on the assumption that the y-coordinate at which light impinges on a wavelength calculation surface 2a and the wavelength have a linear relationship, so that a central value $\lambda C$ in a maximum range of wavelengths of light that can be simultaneously captured is 600 nm, width $\Delta\lambda$ of the maximum wavelength range is 200 nm and the maximum wavelength range $\lambda C-\Delta\lambda/2$ to $\lambda C+\Delta\lambda/2$ is 500 nm to 700 nm. The maximum wavelength range is determined by a variance of the diffraction grating 1, a focal length of the condensing optical system 3a and the magnitude of the photodetector 2.

The diffraction grating 1 is a blazed diffraction grating having a grating frequency of 800 lines/mm and is set up according to Littrow mounting. Furthermore, the condensing optical system 3a is a lens whose chromatic aberration is optimally corrected and disposed so that the optical axis thereof is substantially parallel to light G having the center wavelength $\lambda C$.

In the spectroscopic detector 100a configured as shown above, the angle of emergence from the diffraction grating 1 is nonlinear with respect to the wavelength and the angle of emergence $\beta$ increases as the wavelength increases. As a result, the angle variance also increases as the wavelength increases as shown in aforementioned Equation (2). Furthermore, since the chromatic aberration of the condensing optical system 3a is optimally corrected, the nonlinearity of the angle of emergence with respect to the wavelength is also reflected in coordinates at which light impinges on the photodetector 2 as is.

Therefore, when coordinates of incident light of each wavelength is calculated assuming the linearity of the variance characteristic using the variance of light G of 600 nm as a reference, light B of 500 nm impinges inside the calculated coordinates and light R of 700 nm impinges outside. That is, both light B and light G are calculated as having larger wavelengths than the incident wavelength. To be more specific, light B and light R are miscalculated by approximately 1 nm as 501 nm and 701 nm respectively.

As a result, the spectroscopic detector 100a actually detect light as having 499 nm to 699 nm, deviated by approximately 1 nm from light of 500 nm to 700 nm. That is, a deviation is produced between the incident wavelength and the calculated wavelength.

Assuming the y-coordinate at which light G impinges on the photodetector 2 (wavelength calculation surface 2a) is 0 (origin), yB is a displacement from the origin of the y-coordinate to the coordinate at which light B impinges on the photodetector 2, yR is a displacement from the origin of the y-coordinate to the coordinate at which light R impinges on the photodetector 2, θB is an angle formed by light G and light B and θR is an angle formed by light G and light R, a relationship of yB<yR and θB<θR holds in the spectroscopic detector 100a as shown in FIG. 1.

A technique effective for solving such a technical problem that a detected wavelength deviation occurs in the spectroscopic detector is disclosed in Japanese Patent Laid-Open No. 2000-304614 and Japanese Patent Laid-Open No. 9-89668.

Japanese Patent Laid-Open No. 2000-304614 discloses a technique of arranging nonlinear dispersion compensation means between a wavelength dispersion element that is a diffraction grating or the like and a condensing optical system and thereby compensating nonlinearity of the angle of emergence of a wavelength dispersion element. To be more specific, the document discloses a technique of inserting a prism between a diffraction grating and a condensing optical system to compensate nonlinearity of the angle of emergence and thereby flattening a wavelength dispersion characteristic. Furthermore, an example is also disclosed where a configuration uniting a diffraction grating and a prism eliminates the necessity for adjusting relative positions between the diffraction grating and the prism.

Japanese Patent Laid-Open No. 9-89668 discloses a technique of arranging the normal of a diffraction grating and the optical axis of a condensing optical system parallel to each other using an f·sin θ lens for the condensing optical system and thereby resolving nonlinearity of an image height (incident coordinate) with respect to the wavelength.

According to the techniques disclosed in Japanese Patent Laid-Open No. 2000-304614 and Japanese Patent Laid-Open No. 9-89668, it is possible to compensate for a deviation in a detected wavelength deriving from nonlinearity of the angle of emergence from the diffraction grating or the like.

SUMMARY OF THE INVENTION

One aspect of the present invention is to provide a spectroscopic detector including a spectroscopic element for dispersing light, a photodetector for detecting light dispersed by the spectroscopic element and a condensing optical system that condenses the dispersed light to the photodetector and compensates for a deviation in detected wavelength deriving from nonlinearity of an angle of emergence generated in the spectroscopic element through chromatic aberration of magnification.

BRIEF DESCRIPTION OF THE DRAWINGS

The present invention will be more apparent from the following detailed description when the accompanying drawings are referenced.

FIG. 5 is a diagram showing a comparison between a deviation between a wavelength of light incident on the photodetector included in the spectroscopic detector according to Embodiment 1 and a wavelength calculated from a position of incidence and a deviation between a wavelength of light incident on the photodetector and a wavelength calculated from a position of incidence when a condensing lens of normal design is used;

DESCRIPTION OF THE PREFERRED EMBODIMENTS

Figure 2:
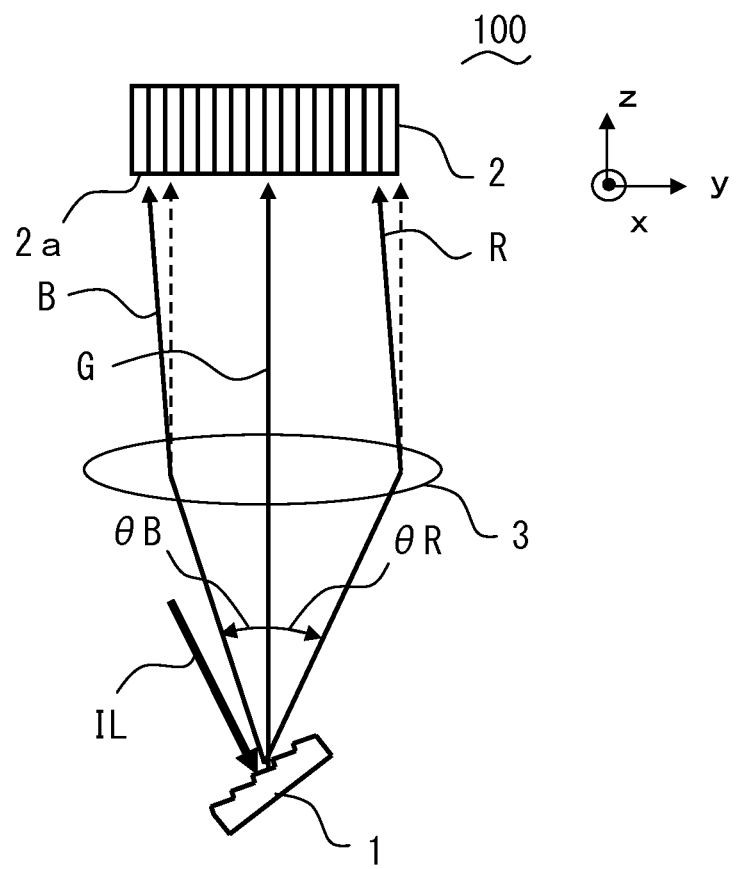
FIG. 2 is a schematic diagram illustrating a basic configuration of a spectroscopic detector according to each embodiment of the present invention.
Figure 2:
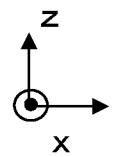

FIG. 2 is a schematic diagram illustrating a basic configuration of a spectroscopic detector according to each embodiment of the present invention. First, a basic configuration of a spectroscopic detector according to each embodiment of the present invention will be described with reference to FIG. 2.

A spectroscopic detector 100 illustrated in FIG. 2 includes a diffraction grating 1, which is a spectroscopic element that disperses light IL, a photodetector 2 that detects the light dispersed by the diffraction grating 1 and a condensing optical system 3 disposed between the diffraction grating 1 and the photodetector 2 to condense the light dispersed by the diffraction grating 1 to the photodetector 2 per wavelength.

Figure 1:
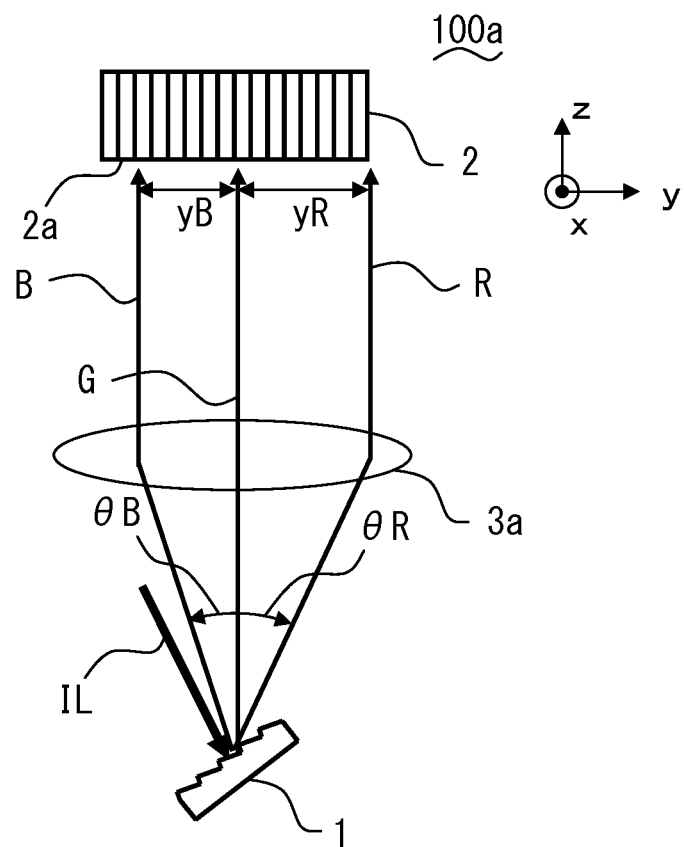
FIG. 1 is a schematic diagram illustrating a configuration of a spectroscopic detector according to a prior art.

The spectroscopic detector 100 is different from the spectroscopic detector 100a according to the prior art illustrated in FIG. 1 in that the condensing optical system 3 is included instead of the condensing optical system 3a. The condensing optical system 3 is a condensing optical system that compensates for a deviation in a detected wavelength deriving from nonlinearity of the angle of emergence generated in the diffraction grating 1 through chromatic aberration of magnification. In FIG. 2, a light beam (broken line) incident on the photodetector 2 via the condensing optical system 3a instead of the condensing optical system 3 is also shown together with a light beam (solid line) incident on the photodetector 2 via the condensing optical system 3 to clearly illustrate the difference in operation between the spectroscopic detector 100 and the spectroscopic detector 100a.

On the assumption that the y-coordinate at which light impinges on the wavelength calculation surface 2a and the wavelength have a linear relationship, the spectroscopic detector 100 is designed so that the central value in a maximum range of wavelengths that can be simultaneously captured is $\lambda C$, width of the maximum wavelength range is $\Delta\lambda$ and the maximum wavelength range is wavelength $\lambda C - \Delta\lambda/2$ to wavelength $\lambda C + \Delta\lambda/2$. Furthermore, in FIG. 2, light G represents light having wavelength $\lambda C$, light B represents light having wavelength $\lambda C - \Delta\lambda/2$, light R represents light having wavelength $\lambda C + \Delta\lambda/2$, $\theta B$ represents an angle formed by light G and light B and $\theta R$ represents an angle formed by light G and light R.

The condensing optical system 3 is arranged so that the optical axis is substantially parallel to light G. Furthermore, the condensing optical system 3 is designed so that chromatic aberration of magnification on the short wavelength side (e.g., chromatic aberration of magnification of light B) is greater than chromatic aberration of magnification on the long wavelength side (e.g., chromatic aberration of magnification of light R), that is, chromatic aberration of magnification on the short wavelength side is generated in a plus direction with respect to the chromatic aberration of magnification on the long wavelength side. In other words, the condensing optical system 3 is configured to satisfy Equation (3) shown below, where $\lambda 1$ and $\lambda 2$ are a minimum value and a maximum value of the wavelength captured by the photodetector 2 respectively, and $\delta 1$ and $\delta 2$ are chromatic aberrations of magnification at a maximum image height of the condensing optical system 3 with respect to the light beams of wavelengths $\lambda 1$ and $\lambda 2$ respectively.

$$\delta 1 > \delta 2 \quad (3)$$

The characteristic that chromatic aberration of magnification on the short wavelength side of the condensing optical system 3 is greater than chromatic aberration of magnification on the long wavelength side is significantly different from the characteristic of the conventional condensing optical system.

Since the refractive index of normal glass used in the condensing optical system is higher when the wavelength is shorter, in a condensing optical system made up of a single lens, light is condensed closer to the condensing optical system when the wavelength is shorter. For this reason, chromatic aberration of magnification on the short wavelength side is smaller than chromatic aberration of magnification on the long wavelength side, that is, chromatic aberration of magnification on the short wavelength side is generated in a minus direction with respect to chromatic aberration of magnification on the long wavelength side. Therefore, the condensing optical system 3 illustrated in FIG. 2 has a chromatic aberration of magnification characteristic opposite to that of the condensing optical system made up of a single lens.

Furthermore, in the spectroscopic detector according to the prior art illustrated in FIG. 1, a lens whose chromatic aberration is optimally corrected or a condensing mirror which produces no chromatic aberration in principle is normally used as the condensing optical system as in the case of the condensing optical system 3a. That is, the spectroscopic detector is configured so that chromatic aberration of magnification on the short wavelength side and chromatic aberration of magnification on the long wavelength side become substantially 0. Therefore, the condensing optical system 3 illustrated in FIG. 2 also has a chromatic aberration of magnification characteristic markedly different from that of the condensing optical system 3a illustrated in FIG. 1.

Furthermore, the condensing optical system 3 is preferably made up of one positive lens and one negative lens and configured so as to satisfy Equation (4) shown below, where vp and vn are an Abbe number of positive lens and an Abbe number of negative lens respectively.

$$2 < vp/vn < 5 \quad (4)$$

Satisfying Equation (4) allows the condensing optical system 3 to set chromatic aberration in an over-corrected condition, and as a result, can easily realize a characteristic that chromatic aberration of magnification on the short wavelength side is greater than chromatic aberration of magnification on the long wavelength side.

In the spectroscopic detector 100, due to the characteristic that chromatic aberration of magnification on the short wavelength side of the condensing optical system 3 is greater than chromatic aberration of magnification on the long wavelength side, chromatic aberration of magnification of light B having a shorter wavelength than light G is generated in a plus direction, while chromatic aberration of magnification of light R having a longer wavelength than light G is generated in a minus direction. For this reason, as illustrated in FIG. 2, in the spectroscopic detector 100 using the condensing optical system 3 compared to a case where the condensing optical system 3a whose chromatic aberration is optimally corrected, light B impinges outside the photodetector 2 and light R impinges inside the photodetector 2.

Thus, displacement of the condensing position of the condensing optical system 3 by chromatic aberration of magnification is displacement toward the short wavelength side and the aforementioned calculated wavelength is deviated toward the long wavelength side with respect to the incident wavelength, which is displacement in a direction opposite to the direction of the deviation in a detected wavelength deriving from nonlinearity of the angle of emergence from the diffraction grating 1. For this reason, the spectroscopic detector 100 can compensate for the deviation in a detected wavelength deriving from nonlinearity of the angle of emergence from the diffraction grating 1 through chromatic aberration of magnification of the condensing optical system 3.

Furthermore, since the deviation in the detected wavelength is compensated through chromatic aberration of magnification of the condensing optical system 3, the spectroscopic detector 100 need not add any optical element other than the condensing optical system 3 between the diffraction grating 1 and the photodetector 2 and never complicates the apparatus configuration. The condensing optical system 3 needs only to be arranged so that the optical axis thereof becomes substantially parallel to light of the center wavelength (light G in FIG. 2), which makes an adjustment very easy. For this reason, the burden on the adjustment operation is also small.

Furthermore, since the optical axis thereof is substantially parallel to the light of the center wavelength, the condensing optical system 3 can be configured as an optical system for which an incident light beam forms a relatively small angle of incidence. Thus, the condensing optical system 3 can secure sufficient image forming performance without any complicated configuration. Furthermore, the optical characteristic that chromatic aberration of magnification on the short wavelength side is greater than chromatic aberration of magnification on the long wavelength side can also be realized with an optical system in a simple configuration, as shown in embodiments which will be described later.

Therefore, the spectroscopic detector 100 can compensate for a deviation between an incident wavelength and a calculate wavelength deriving from nonlinearity of the angle of emergence from the diffraction grating 1, which is a spectroscopic element, in a simple configuration.

Furthermore, since the simple configuration thereof reduces the number of optical elements through which light passes before impinging on the photodetector 2, the spectroscopic detector 100 can also achieve effects such as improvement of detection sensitivity and reduction of stray light.

Hereinafter, each embodiment will be described more specifically.

Embodiment 1

Figure 3:
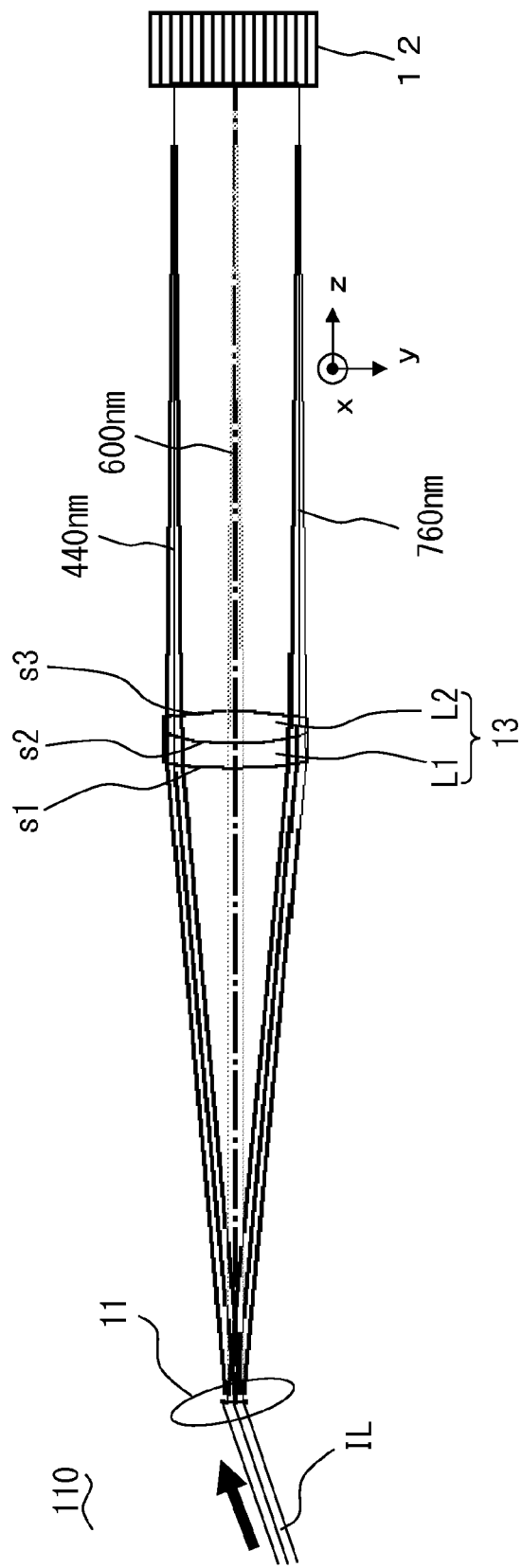
FIG. 3 is a schematic diagram illustrating a configuration of a spectroscopic detector according to Embodiment 1.

FIG. 3 is a schematic diagram illustrating a configuration of a spectroscopic detector according to the present embodiment. A spectroscopic detector 110 illustrated in FIG. 3 includes a VPH grating 11, which is a spectroscopic element for dispersing light IL, an array detector 12 which is a photodetector for detecting the light dispersed by the VPH grating 11 and a condensing lens 13, which is a condensing optical system, disposed between the VPH grating 11 and the array detector 12 to condense the dispersed light to the array detector 12 per wavelength. In the spectroscopic detector 110, the front surface of the array detector 12 is a wavelength calculation surface.

The grating frequency of the VPH grating 11 is 600 lines/mm. The array detector 12 has 32 detection cells and the size of each cell in the y direction is 1 mm.

The condensing lens 13 is a cemented lens made up of a meniscus lens (negative lens L1) having a negative power with its convex surface directed toward the VPH grating 11 side and a double convex lens (positive lens L2) having a positive power, configured so as to compensate for a deviation in a detected wavelength deriving from nonlinearity of the angle of emergence generated in the VPH grating 11 through chromatic aberration of magnification.

Substantially parallel light IL is dispersed by the VPH grating 11 and impinges on the condensing lens 13. The dispersed light incident on the condensing lens 13 is condensed per wavelength by the condensing lens 13 to the array detector 12. Since the y-coordinate at which the dispersed light impinges on the array detector 12 differs from one wavelength to another, the wavelength is calculated from the coordinate of incidence thereof.

In the spectroscopic detector 110, the width of a maximum range of wavelengths that can be simultaneously captured by the array detector 12 is set to 320 nm and the maximum wavelength range is set to 440 nm to 760 nm as shown in FIG. 3. For this reason, when detection cells are sequentially numbered starting from the extreme minus side along the y-axis, assuming the cell on the extreme minus side as a first cell and the cell on the extreme plus side as a 32nd cell, light detected at the first cell is calculated as light of 440 nm to 450 nm and light detected at the 32nd cell is calculated as light of 750 nm to 760 nm. Therefore, when capturing light of, for example, 520 nm to 620 nm, the spectroscopic detector 110 may use detection results of a ninth cell to 18th cell.

The lens data of the condensing lens 13 is as follows.

| | Condensing lens 13 | | | |
|---|---|---|---|---|
| s | r | d | nd | vd |
| 0 (spectroscopic element) | ∞ | 160 | | |
| 1 | 133.35 | 6 | 1.79838 | 29.84 |
| 2 | 65.411 | 8 | 1.49662 | 81.54 |
| 3 | −103.0911 | | | | where, s denotes a surface number, r denotes a radius of curvature (mm), d denotes a surface interval (mm), nd denotes a refractive index with respect to a d-line and vd denotes an Abbe number. A surface number s0 denotes the surface of emergence of the VPH grating 11. Therefore, a surface number s1 denotes a surface closest to the VPH grating 11 side of the condensing lens 13. Furthermore, a surface distance d0 denotes a distance between the VPH grating 11 and the condensing lens 13.

Furthermore, chromatic aberration of magnification $\delta 1$ at a maximum image height of the condensing lens 13 with respect to light of wavelength 440 nm, chromatic aberration of magnification $\delta 2$ at a maximum image height of the condensing lens 13 with respect to light of wavelength 760 nm, Abbe number vn of the negative lens L1 of the condensing lens 13 and Abbe number vp of the positive lens L2 of the condensing lens 13 are as follows.

$$\delta 1=0.217, \delta 2=-0.056, vn=29.84, vp=81.54$$

Therefore, the condensing lens 13 satisfies aforementioned Equation (3) and Equation (4).

Furthermore, a condensing lens of normal design whose chromatic aberration of magnification is optimally corrected (not shown) is also disclosed for a comparison with the condensing lens 13. The condensing lens of normal design is also configured as a cemented lens made up of a negative lens and a positive lens as in the case of the condensing lens 13.

The lens data of the condensing lens of normal design is as follows.

| | Condensing lens of normal design | | | |
|---|---|---|---|---|
| s | r | d | nd | vd |
| 0 (spectroscopic element) | ∞ | 160 | | |
| 1 | 126.0481 | 6 | 1.70049 | 41.24 |
| 2 | 60.3517 | 8 | 1.49662 | 81.54 |
| 3 | −123.6468 | | | |

Furthermore, chromatic aberration of magnification $\delta 1$ at a maximum image height of the condensing lens of normal design for light of wavelength 440 nm, chromatic aberration of magnification $\delta 2$ at a maximum image height of the condensing lens of normal design for light of wavelength 760 nm, Abbe number vn of the negative lens of the condensing lens of normal design and Abbe number vp of the positive lens of the condensing lens of normal design are as follows.

$$\delta 1=0.0132, \delta 2=0.0133, vn=41.24, vp=81.54$$

Therefore, the condensing lens of normal design satisfies neither aforementioned Equation (3) nor Equation (4) unlike the condensing lens 13.

Figure 4:
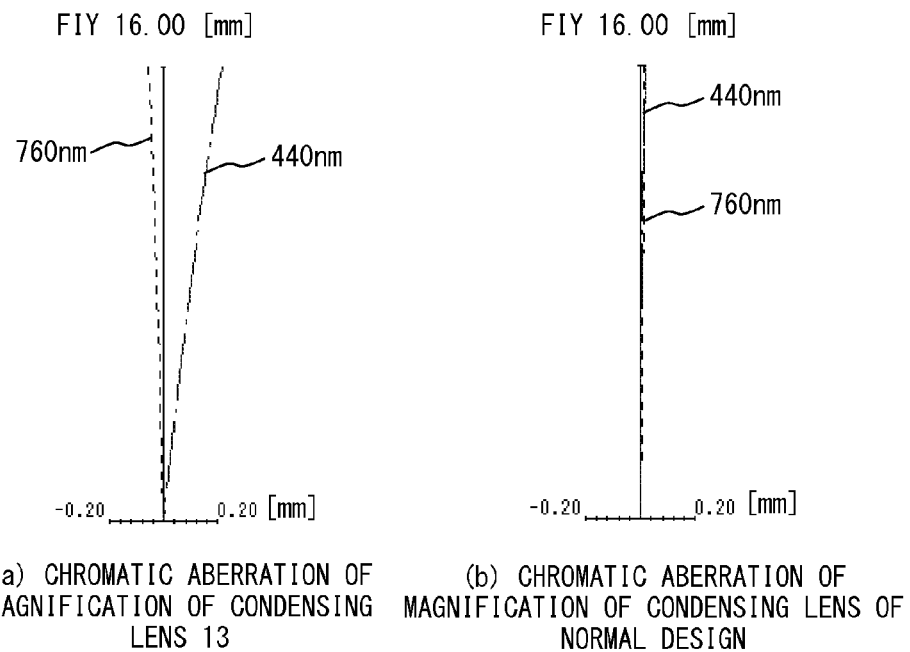
FIG. 4 is a diagram showing a comparison between chromatic aberration of magnification of a condensing lens included in the spectroscopic detector according to Embodiment 1 and chromatic aberration of magnification of a condensing lens of normal design.

FIG. 4 is a diagram showing a comparison between chromatic aberration of magnification of the condensing lens 13 included in the spectroscopic detector 110 according to the present embodiment and chromatic aberration of magnification of the condensing lens of normal design. FIG. 4(*a*) is a diagram of chromatic aberration of magnification of the condensing lens 13 and shows chromatic aberration of magnification at a maximum wavelength (760 nm) and chromatic aberration of magnification at a minimum wavelength (440 nm) with reference to the captured center wavelength (600 nm) of the spectroscopic detector 110 according to the present embodiment. FIG. 4(*b*) is a diagram of chromatic aberration of the condensing lens of normal design and shows chromatic aberration of magnification at a maximum wavelength (760 nm) and chromatic aberration of magnification at a minimum wavelength (440 nm) with reference to the captured center wavelength (600 nm) of the spectroscopic detector 110. "FIY" in the aberration diagram denotes an image height.

As is illustrated in FIG. 4, the condensing lens 13 generates greater chromatic aberration of magnification than the condensing lens of normal design. Furthermore, in the condensing lens 13, chromatic aberration of magnification of 440 nm is greater than that of 760 nm. That is, chromatic aberration of magnification on the short wavelength side is generated in a plus direction with respect to chromatic aberration of magnification on the long wavelength side.

FIG. 5 is a diagram showing a comparison between a deviation between the wavelength of light incident on the array detector 12 included in the spectroscopic detector 110 according to the present embodiment and a wavelength calculated from the position of light of incidence and a deviation between the wavelength of light incident on the array detector 12 when a condensing lens of normal design is used instead of the condensing lens 13 and a wavelength calculated from the position of light of incidence. The horizontal axis shows the wavelength of light incident on the array detector 12 (incident wavelength), the vertical axis shows a deviation between the incident wavelength and the calculated wavelength (deviation in detected wavelength), the black bar graph shows a deviation in the condensing lens 13 and the white bar graph shows a deviation in the condensing lens of normal design. As shown in FIG. 5, using the condensing lens 13 allows the deviation in the detected wavelength to be reduced as a whole compared to the case where the condensing lens of normal design is used.

As described so far, the spectroscopic detector 110 can compensate for a deviation between an incident wavelength and a calculated wavelength deriving from nonlinearity of the angle of emergence from the VPH grating 11, which is a spectroscopic element, using the condensing lens 13 in a simple configuration, which is a cemented lens made up of the negative lens L1 and the positive lens L2.

Embodiment 2

Figure 6:
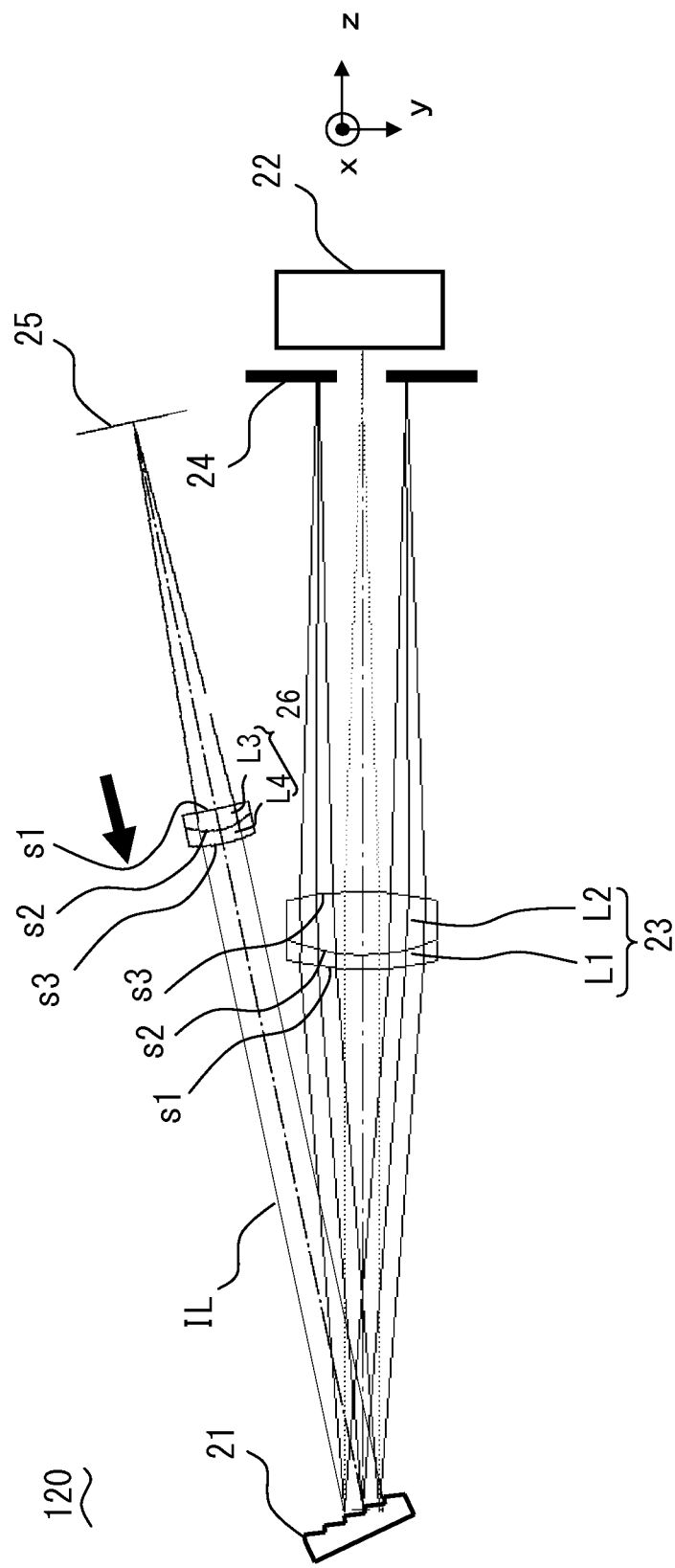
FIG. 6 is a schematic diagram illustrating a configuration of a spectroscopic detector according to Embodiment 2.

FIG. 6 is a schematic diagram illustrating a configuration of a spectroscopic detector according to the present embodiment. A spectroscopic detector 120 illustrated in FIG. 6 includes a blazed reflection type diffraction grating 21, which is a spectroscopic element for dispersing light IL, a photomultiplier tube (PMT) 22, which is a photodetector for detecting the light dispersed by the blazed reflection type diffraction grating 21, a condensing lens 23, which is a condensing optical system disposed between the blazed reflection type diffraction grating 21 and the PMT 22 for condensing the dispersed light to the PMT 22 and a movable slit 24 disposed in front of the PMT 22 for limiting light incident on the PMT 22. In the spectroscopic detector 120, the surface on which the slit 24 is located is a wavelength calculation surface.

The spectroscopic detector 120 further includes a slit 25 that causes light to impinge on the spectroscopic detector 120 and a collimator lens 26, which is a collimator optical system disposed between the slit 25 and the blazed reflection type diffraction grating 21 for converting the light from the slit 25 to substantially parallel light.

The grating frequency of the blazed reflection type diffraction grating 21 is 800 lines/mm. The maximum width of the slit 24 is 10 mm.

The condensing lens 23 is a cemented lens made up of a meniscus lens (negative lens L1) having a negative power with a convex surface directed to the blazed reflection type diffraction grating 21 side and a double convex lens (positive lens L2) having a positive power and is configured to compensate for a deviation in a detected wavelength deriving from nonlinearity of the angle of emergence generated in the blazed reflection type diffraction grating 21 through chromatic aberration of magnification.

The collimator lens 26 is a cemented lens made up of a plane-convex lens (positive lens L3) having a positive power with its convex surface directed toward the blazed reflection type diffraction grating 21 side and a meniscus lens (negative lens L4) having a negative power with its convex surface directed toward the blazed reflection type diffraction grating 21 side, configured to compensate for axial chromatic aberration generated on the condensing lens 23.

Axial chromatic aberration occurs on the condensing lens 23 caused by chromatic aberration of magnification to compensate for a deviation in a detected wavelength. For this reason, in the spectroscopic detector 120, the image forming performance may deteriorate due to axial chromatic aberration generated on the condensing lens 23, which impairs the resolution of dispersion. The collimator lens 26 is configured to produce axial chromatic aberration to compensate for axial chromatic aberration generated on the condensing lens 23. Therefore, the spectroscopic detector 120 can correct axial chromatic aberration on the wavelength calculation surface by combining the condensing lens 23 and the collimator lens 26. That is, the collimator lens 26 is functioning as a resolution maintaining optical system of the spectroscopic detector 120.

Light passing through the slit 25 and impinging on the spectroscopic detector 120 is converted to substantially parallel light IL by the collimator lens 26 and impinges on the blazed reflection type diffraction grating 21. The substantially parallel light IL is dispersed by the blazed reflection type diffraction grating 21 and impinges on the condensing lens 23. The dispersed light impinging on the condensing lens 23 is condensed to the slit 24 by the condensing lens 23 and impinges on the PMT 22. Since the y-coordinate at which the dispersed light impinges on the slit 24 differs from one wavelength to another, moving the slit 24 in the y direction makes it possible to limit the wavelength range of light incident on the PMT 22.

The spectroscopic detector 120 is set, when the slit 24 has maximum width 10 mm, such that the width of a maximum range of wavelengths that can be simultaneously captured by the PMT 22 is 200 nm and the maximum wavelength range is 500 nm to 700 nm. That is, the spectroscopic detector 120 is set so as to capture a 20 nm wavelength range per opening width 1 mm of the slit 24. Therefore, when the wavelength range to be captured is 50 nm, the opening width of the slit 24 is calculated as 50/20=2.5 mm. Furthermore, when the coordinate of incident light of center wavelength 600 nm is assumed to be y=0, if the wavelength range to be captured is set to 520 nm to 620 nm, the coordinates of the opening ends of the slit 24 are calculated as (520-600)/20=−4 mm and (620-600)/20=1 mm.

The lens data of the condensing lens 23 is as follows.

| Condensing lens 23 | | | | |
|---|---|---|---|---|
| s | r | d | nd | vd |
| 0 (spectroscopic element) | ∞ | 60 | | |
| 1 | 36.3245 | 1.6 | 1.8081 | 22.76 |
| 2 | 21.4143 | 7 | 1.43875 | 94.93 |
| 3 | −37.3293 | | | | where, s denotes a surface number, r denotes a radius of curvature (mm), d denotes a surface distance (mm), nd denotes a refractive index with respect to a d-line and vd denotes an Abbe number. A surface number s0 denotes a surface of emergence of the blazed reflection type diffraction grating 21. Therefore, a surface number s1 represents the surface of the condensing lens 23 closest to the blazed reflection type diffraction grating 21 side. Furthermore, a surface distance d0 represents a distance between the blazed reflection type diffraction grating 21 and the condensing lens 23.

Furthermore, chromatic aberration of magnification $\delta 1$ at a maximum image height of the condensing lens 23 with respect to light of wavelength 500 nm, chromatic aberration of magnification $\delta 2$ at a maximum image height of the condensing lens 23 with respect to light of wavelength 700 nm, Abbe number vn of the negative lens L1 of the condensing lens 23 and Abbe number vp of the positive lens L2 of the condensing lens 23 are as follows.

$$\delta 1 = 0.06, \delta 2 = -0.038, vn = 22.76, vp = 94.93$$

Therefore, the condensing lens 23 satisfies aforementioned Equation (3) and Equation (4).

Furthermore, for a comparison with the condensing lens 23, a condensing lens of normal design (not shown) whose chromatic aberration of magnification is optimally corrected is also disclosed. The condensing lens of normal design is also configured as a cemented lens made up of a negative lens and a positive lens as in the case of the condensing lens 23.

The lens data of the condensing lens of normal design is as follows.

| Condensing lens of normal design | | | | |
|---|---|---|---|---|
| s | r | d | nd | vd |
| 0 (spectroscopic element) | ∞ | 60 | | |
| 1 | 40.68 | 2 | 1.66672 | 48.32 |
| 2 | 20.4963 | 4 | 1.43875 | 94.93 |
| 3 | −38.2733 | | | |

Furthermore, chromatic aberration of magnification $\delta 1$ at a maximum image height of the condensing lens of normal design for light of wavelength 500 nm, chromatic aberration of magnification $\delta 2$ at a maximum image height of the condensing lens of normal design for light of wavelength 700 nm, Abbe number vn of the negative lens of the condensing lens of normal design and Abbe number vp of the positive lens of the condensing lens of normal design are as follows.

$$\delta 1 = -0.0015, \delta 2 = 0.0029, vn = 48.32, vp = 94.93$$

Therefore, the condensing lens of normal design satisfies neither aforementioned Equation (3) nor Equation (4).

Figure 7:
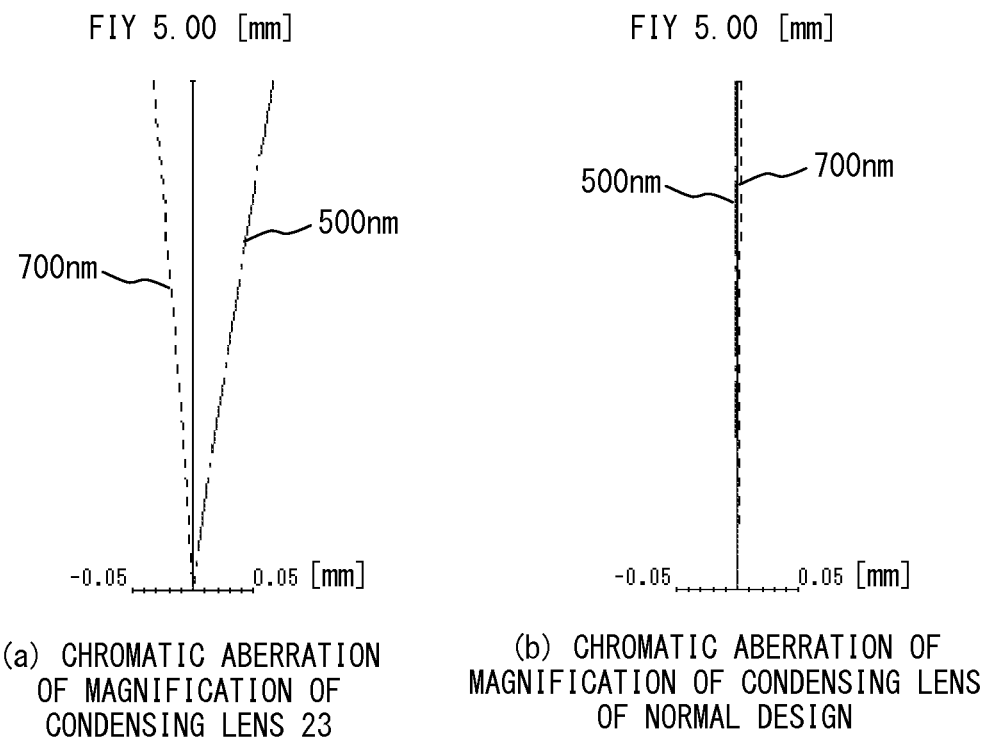
FIG. 7 is a diagram showing a comparison between chromatic aberration of magnification of a condensing lens included in the spectroscopic detector according to Embodiment 2 and chromatic aberration of magnification of a condensing lens of normal design.

FIG. 7 is a diagram showing a comparison between chromatic aberration of magnification of the condensing lens 23 included in the spectroscopic detector 120 according to the present embodiment and chromatic aberration of magnification of the condensing lens of normal design. FIG. 7(a) is a diagram of chromatic aberration of magnification of the condensing lens 23 and shows chromatic aberration of magnification at a maximum wavelength (700 nm) and chromatic aberration of magnification at a minimum wavelength (500 nm) with reference to the captured center wavelength (600 nm) of the spectroscopic detector 120 according to the present embodiment. FIG. 7(b) is a diagram of chromatic aberration of the condensing lens of normal design and shows chromatic aberration of magnification at a maximum wavelength (700 nm) and chromatic aberration of magnification at a minimum wavelength (500 nm) with reference to the captured center wavelength (600 nm) of the spectroscopic detector 120. "FIY" in the aberration diagram denotes an image height.

As illustrated in FIG. 7, the condensing lens 23 generates greater chromatic aberration of magnification than the condensing lens of normal design. Furthermore, in the condensing lens 23, chromatic aberration of magnification of 500 nm is greater than that of 700 nm. That is, chromatic aberration of magnification on the short wavelength side is generated in a plus direction with respect to chromatic aberration of magnification on the long wavelength side.

Furthermore, the lens data of the collimator lens 26 is as follows.

| Collimator lens 26 | | | | |
|---|---|---|---|---|
| s | r | d | nd | vd |
| 0 (slit) | ∞ | 28.223 | | |
| 1 | ∞ | 1.5 | 1.48749 | 70.23 |
| 2 | −5.0973 | 1 | 1.51633 | 64.14 |
| 3 | −13.2916 | 50 | | | where, a surface number s0 denotes a surface on which the slit 25 is located. Therefore, a surface number s1 represents the surface of the collimator lens 26 closest to the slit 25 side. Furthermore, a surface distance d0 represents a distance between the slit 25 and the collimator lens 26.

Figure 8:
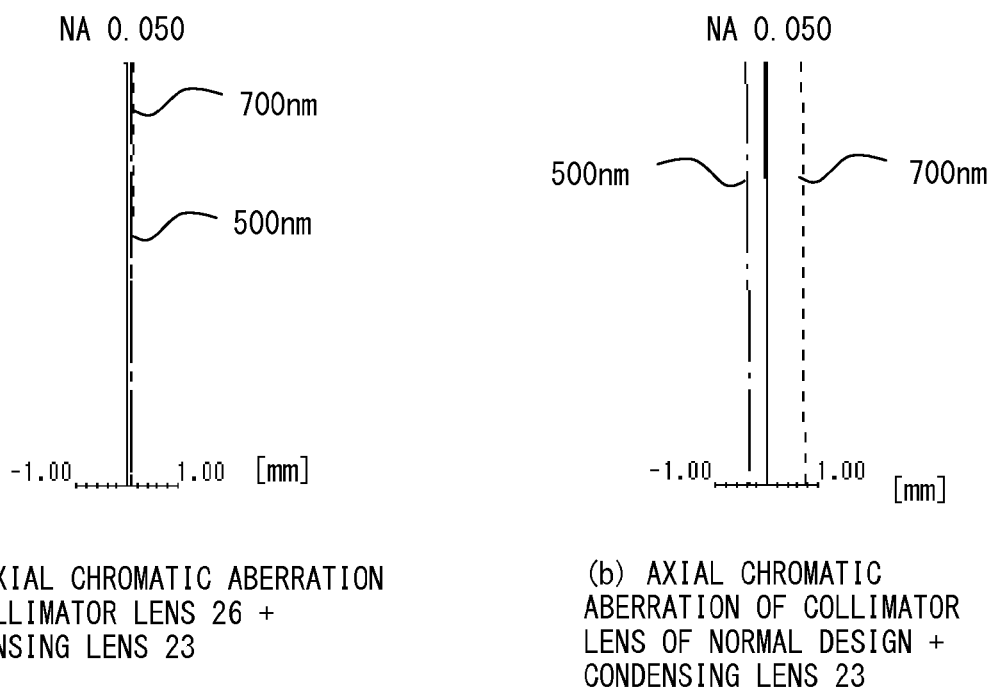
FIG. 8 is a diagram showing a comparison between spherical aberration of a collimator lens included in the spectroscopic detector according to Embodiment 2 and spherical aberration of a collimator lens whose aberration is optimally corrected.

FIG. 8 is a diagram showing a comparison between axial chromatic aberration of the collimator lens 26 included in the spectroscopic detector according to the present embodiment and axial chromatic aberration of the collimator lens whose aberration is optimally corrected. FIG. 8 shows axial chromatic aberration at a maximum wavelength (700 nm) and axial chromatic aberration at a minimum wavelength (500 nm) with reference to a captured center wavelength (600 nm) of the spectroscopic detector 120 according to the present embodiment. FIG. 8(a) is a diagram of spherical aberration of the optical system combining the collimator lens 26 and the condensing lens 23. FIG. 8(b) is a diagram of spherical aberration of the optical system combining the collimator lens whose aberration is optimally corrected and the condensing lens 23. "NA" in the aberration diagram represents a numerical aperture.

The spectroscopic detector 120 uses the condensing lens 23 having the aforementioned characteristic and the collimator lens 26 having the aforementioned characteristic in combination, and can thereby compensate for a deviation in a detected wavelength deriving from nonlinearity of the angle of emergence generated in the blazed reflection type diffraction grating 21 through chromatic aberration of magnification of the condensing lens 23 and compensate for axial chromatic aberration generated on the condensing lens 23 using spherical aberration of the collimator lens 26.

Figure 9:
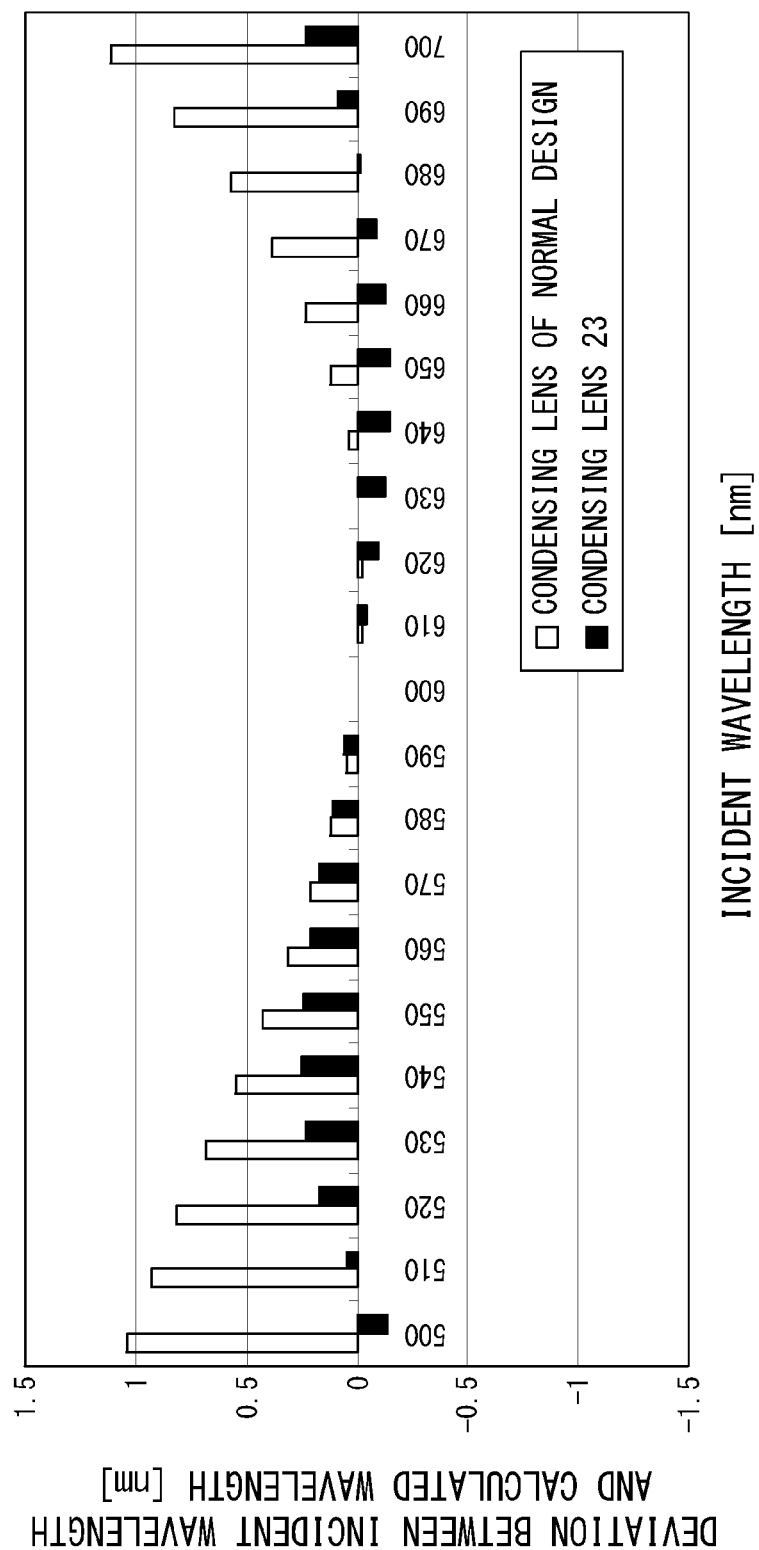
FIG. 9 is a diagram showing a comparison between a deviation between a wavelength of light incident on the photodetector included in the spectroscopic detector according to Embodiment 2 and a wavelength calculated from a position of incidence and a deviation between a wavelength of light incident on the photodetector and a wavelength calculated from a position of incidence when a condensing lens of normal design is used.

FIG. 9 is a diagram showing a comparison between a deviation between the wavelength of light incident on the PMT 22 included in the spectroscopic detector 120 according to the present embodiment and a wavelength calculated from the position of the slit 24 and a deviation between the wavelength of light incident on the PMT 22 when a condensing lens of normal design is used instead of the condensing lens 23 and a wavelength calculated from the position of the slit 24. The horizontal axis shows the wavelength of light incident on the PMT 22 (incident wavelength), the vertical axis shows a deviation between the incident wavelength and the calculated wavelength (deviation in detected wavelength), the black bar graph shows a deviation in the condensing lens 23 and the white bar graph shows a deviation in the condensing lens of normal design. As shown in FIG. 9, using the condensing lens 23 allows the deviation in the detected wavelength to be reduced as a whole compared to the case where the condensing lens of normal design is used.

As described so far, the spectroscopic detector 120 can compensate for a deviation between an incident wavelength and a calculated wavelength deriving from nonlinearity of the angle of emergence from the blazed reflection type diffraction grating 21, which is a spectroscopic element, using the condensing lens 23 in a simple configuration, which is a cemented lens made up of the negative lens L1 and the positive lens L2 as in the case of Embodiment 1. Furthermore, correcting axial chromatic aberration generated in the condensing lens 23 using the collimator lens 26 allows the spectroscopic detector 120 to maintain the resolution of dispersion.

An example has been described in aforementioned Embodiment 1 and Embodiment 2 where a cemented lens (condensing lens 13 and condensing lens 23) is used as the condensing optical system, but the configuration of the condensing optical system is not limited to the cemented lens. For example, the condensing optical system may also be configured by providing a tiny gap between the lens L1 and the lens L2. Furthermore, the condensing optical system needs only to be an optical element that can adjust chromatic aberration of magnification on the wavelength calculation surface, and may be, for example, a diffraction optical element such as so-called DOE (Diffractive Optical Element) that can generate dispersion in a direction opposite to that of the normal optical system.

Furthermore, as the spectroscopic element, Embodiment 1 shows an example using a VPH grating and Embodiment 2 shows an example using a blazed reflection type diffraction grating, but the spectroscopic element is not particularly limited to these gratings. Furthermore, an example has been described in Embodiment 1 and Embodiment 2 where substantially parallel light is made to impinge on the spectroscopic element, but without being limited to this, diverging light or convergent light may also be made to impinge.

What is claimed is:

1. A spectroscopic detector comprising:
    a spectroscopic element which disperses light;
    a photodetector which detects the light dispersed by the spectroscopic element; and
    a condensing optical system which condenses the dispersed light to the photodetector, and which compensates for a deviation in a detected wavelength deriving from nonlinearity of an angle of emergence generated in the spectroscopic element through chromatic aberration of magnification;
    wherein assuming $\lambda 1$ is a minimum value of wavelengths captured by the photodetector, $\lambda 2$ is a maximum value of wavelengths captured by the photodetector, $\delta 1$ is chromatic aberration of magnification at a maximum image height of the condensing optical system with respect to light of wavelength $\lambda 1$, and $\delta 2$ is chromatic aberration of magnification at a maximum image height of the condensing optical system with respect to light of wavelength $\lambda 2$, the following conditional expression is satisfied: $\delta 1 > \delta 2$.

2. The spectroscopic detector according to claim 1, wherein the condensing optical system comprises one positive lens and one negative lens, and assuming that an Abbe number of the positive lens is $\nu p$, and an Abbe number of the negative lens $\nu n$, the following conditional expression is satisfied: $2 < \nu p / \nu n < 5$.

3. The spectroscopic detector according to claim 1, further comprising:
    a slit that causes light to impinge on the spectroscopic detector; and
    a collimator optical system placed between the slit and the spectroscopic element, wherein axial chromatic aberration generated in the condensing optical system is corrected by the collimator optical system.

* * * * *